Aug. 3, 1965 P. W. NIPPERT 3,197,843

METHOD OF FORMING A MOUNT FOR SEMICONDUCTORS

Filed May 19, 1961 4 Sheets-Sheet 1

INVENTOR.
PAUL W. NIPPERT
BY
Schmieding and Fultz
HIS ATTORNEYS

METHOD OF FORMING A MOUNT FOR SEMICONDUCTORS

Filed May 19, 1961 4 Sheets-Sheet 2

INVENTOR.
PAUL W. NIPPERT
BY
Schmieding and Fultz
HIS ATTORNEYS

Aug. 3, 1965 P. W. NIPPERT 3,197,843

METHOD OF FORMING A MOUNT FOR SEMICONDUCTORS

Filed May 19, 1961 4 Sheets-Sheet 3

INVENTOR.
PAUL W. NIPPERT

BY
SCHMIEDING & FULTZ

ATTORNEYS

INVENTOR.
PAUL W. NIPPERT
BY
SCHMIEDING & FULTZ
ATTORNEYS 3,197,843

METHOD OF FORMING A MOUNT FOR SEMICONDUCTORS

Paul W. Nippert, Worthington, Ohio, assignor to The Nippert Electric Products Company, Columbus, Ohio, a corporation of Ohio Filed May 19, 1961, Ser. No. 111,343
2 Claims. (Cl. 29—155.5)

This invention relates to solid state semiconductors and methods of making same.

This application is a continuation-in-part of co-pending application Serial No. 43,699, filed July 11, 1960, which is a continuation-in-part of application Serial No. 813,552, filed May 15, 1959, now abandoned.

More specifically, the present invention relates to a novel mounting means for supporting solid state semiconductors. Mounting means of this general type comprise a main mount portion including a platform provided with an upper surface for supporting a semiconductor and a downwardly extending stem that is generally threaded so that the assembly can be attached to a heat sink panel by screwing the stem into a threaded hole.

In forming semiconductor mounts of this type it is the general practice in the art to machine the main mount portion from copper, including the platform and stem, and to silver-braze a thin disk, of molybdenum or other suitable metal, to the upper surface of the platform. A semiconductor, formed of germanium, silicon, or other suitable material, is next soft-soldered directly to the molybdenum. The purpose of the molybdenum disk is to provide a conductive interlayer between the semiconductor and copper mount portion that has substantially the same coefficient of thermal expansion as the semiconductor so that the soldered junction between the semiconductor and the underlying supporting surface will not become fractured by thermally imposed expansion and contraction during use of the finished semiconductor.

It has also been the practice in the art to silver-braze a weld ring, of nickel-plated steel or other suitable metal, to the top surface of the copper mount portion, in surrounding relationship with the semiconductor. The function of such weld ring is to provide a steel surface to which the cover portion can be subsequently attached by flash welding.

In the course of silver-brazing the above described molybdenum disk and steel weld ring to the main mount portion, it is, of course, necessary to heat the main mount portion to about 1150 degrees F. or above which mount portion, if not previously annealed, becomes annealed during the heating operation with the result that the mount portion is necessarily soft and hence lacks strength.

In accordance with one aspect of the present invention, an improved semiconductor mount of the type described is formed by a novel method wherein the main mount portion is die cut from sheet copper to first form a disk-shaped workpiece. The upper surface of the copper workpiece is provided with a central recess for receiving and locating the previously mentioned molybdenum disk and an annular recess for receiving and locating the previously mentioned steel weld ring. The molybdenum disk and weld ring are next silver-brazed to the copper workpiece which workpiece, if not previously annealed, becomes annealed under the application of heat during the silver-brazing operation. It will be understood that the assembly, at this stage of the process, includes an annealed copper workpiece that lacks strength as compared to work-hardened copper.

The assembly, including the workpiece, molybdenum disk to which the semiconductor is subsequently attached, and the steel weld ring to which the cover portion is subsequently attached, is next subjected to pressure in a confining die whereby the metal in the copper workpiece is caused to flow and form a stem portion extending downwardly from a platform portion. This causes the previously annealed copper to assume the shape of the main mount portion and become work-hardened to full hard copper with a resulting high increase in strength.

If desired, when the main copper mount portion is being shaped by subjecting the workpiece to pressure in the confining die, the metal may also be caused to form an integral upwardly extending annular flange in surrounding relationship with the transistor element and inwardly of the steel weld ring to provide a splash shield, that protects the semiconductor from molten splashes of welding material when a cup-shaped cover portion is subsequently flash welded to the previously mentioned weld ring to provide a cover for the semiconductor.

It will therefore be understood that in practicing the method of the present invention, the molybdenum disk, to which the semiconductor is subsequently secured, and the steel weld ring, for subsequently mounting a cover portion, are heat fused to the copper workpiece prior to actually pressure forming the workpiece to the shape required for the finished main mount. Hence all heating and therefore all annealing of the copper occurs prior to the pressure forming operation whereby the main mount portion ends up formed in a work-hardened state. This results in a finished semiconductor mount assembly that includes not only a thermally fused molybdenum disk and steel weld ring but also a mount portion formed of full hard copper that possesses high strength.

In accordance with another aspect of the present invention a modified semiconductor mount is formed from a disk-shaped workpiece that includes a raised central portion on one side thereof. An annular weld ring and underlying layer of silver-brazed material are positioned on the workpiece with the central raised portion serving merely to locate the weld ring and underlying brazing material. The assembly is next heated to fuse the weld ring to the copper workpiece and the fused assembly is next subjected to pressure in a confining die to cause a first flow of metal that forms a downwardly extending stem and a second flow of metal that forms an upwardly extending platform on which the semiconductor is subsequently mounted.

If desired, the method just described can be modified to provide an upstanding annular flange on the weld ring by the application of pressure to the inner portion of the weld ring and by the subsequent machining away of metal from the upper outer portion of the weld ring.

As another aspect of the present invention a novel modified semiconductor mount is formed from a copper blank having an upstanding peripheral flange on one side thereof. An annular disk of silver-brazing material is next positioned on the blank with the upstanding peripheral flange serving as locating means. A central disk of molybdenum and a surrounding annular weld ring are next positioned over the disk of brazing material. After the assembly is thermally fused it is subjected to pressure in a suitable confining die to cause a first flow of metal to form a downwardly extending stem and a second flow of metal that forms an upwardly extending platform that carries the previously mentioned molybdenum disk and it is surrounded by the previously mentioned weld ring.

As still another aspect of the present invention a novel modified semiconductor mount is formed from a copper blank having an annular upstanding peripheral flange which serves to locate a steel disk and an underlying disk of silver brazing material both of which cover substantially the entire top surface of the blank. The assembly is thermally fused and then subjected to pressure to form a downwardly extending work-hardened stem and an upwardly extending central platform. Since the steel disk substantially covered the top of the blank prior to the application of pressure it forms a one piece cover for not only the top and sides of the raised central platform but also the annular depressed portion of the copper base to which the cup-shaped cover is subsequently attached.

As still another aspect of the present invention the previously described methods can be modified to provide a semiconductor mount that includes a work-hardened copper platform with an annealed copper weld ring thermally fused to its upper surface. This weld ring replaces the previously mentioned steel weld ring and provides an advantage in that the previously mentioned cup-shaped cover portion can be attached to the soft copper weld ring by cold or pressure welding techniques.

Since the copper platform is in a work-hardened state its threaded stem possesses high mechanical strength whereby it can be screwed down into the heat sink sufficiently tightly, without failure, to provide high conductivity between the heat sink and the mount. This permits higher amperage ratings for semiconductors of a given size.

Further objects and advantages of the present invention will be apparent from the following description, reference being had to the accompanying drawings wherein preferred forms of embodiments of the invention are clearly shown.

Although the present drawings and specification describe and illustrate transistor mounts it will be understood that other semiconductors such as rectifiers and diodes can be produced in accordance with the present invention without departing from the spirit thereof.

Figure 1:
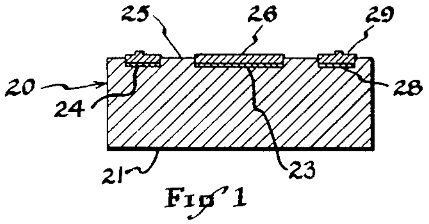
FIG. 1 is a side elevational view of a workpiece formed in accordance with the method of the present invention, the section being taken along the line 1—1 of FIG. 3.
Figure 2:
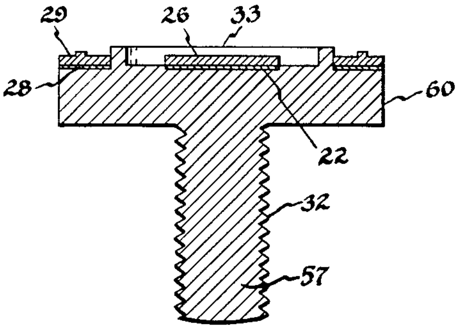
FIG. 2 is a side sectional view of a transistor mount formed from the workpiece of FIG. 1, the section being taken along the line 2—2 of FIG. 4.

As seen in FIGS. 1 and 2, a metal blank indicated generally at 20 is formed from copper or other suitable metal of high electrical conductivity. For example, blank 20 can be die cut from sheet copper. Workpiece 20 includes a lower surface 21 and an upper surface 25, the latter being provided with a central recess 23 and an annular recess 24 formed by applying pressure to said upper surface 25 with a coining die. It is preferable to coin central recess 23 and annular recess 24 simultaneously with and by the same die used in blanking the workpiece from the sheet copper.

A disk 22 of silver brazing metal is positioned in the bottom of central recess 23 and a molybdenum disk 26 is positioned on top of silver brazing metal disk 25, the outer edges of said molybdenum disk being engaged by the sides of recess 23.

With continued reference to FIGS 1 and 2 an annular disk 28 of silver brazing material is disposed in annular recess 24 and weld ring 29, preferably formed of steel, is positioned over silver brazing metal disk 28 with the side edges of annular recess 24 confronting the side edges of weld ring 29.

The assembly of FIGS. 1 and 2 is next heated to fuse silver brazing metal disks 25 and 28 and thereby secure molybdenum disk 26 and weld ring 29 to workpiece 20.

Figure 3:
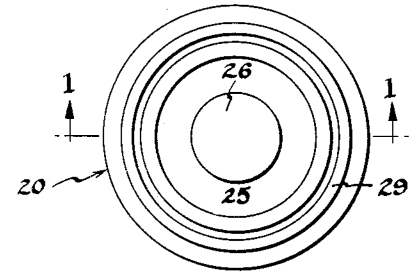
FIG. 3 is a top elevational view of the workpiece of FIG. 1.
Figure 4:
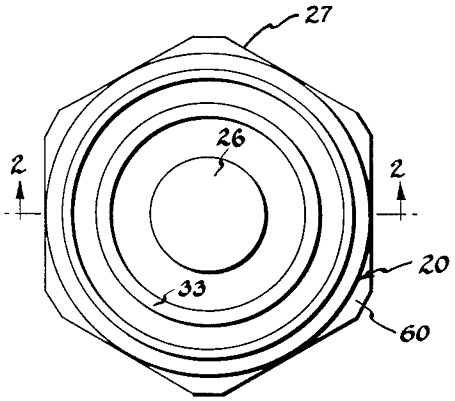
FIG. 4 is a top elevational view of the transistor mount of FIG. 2.
Figure 11:
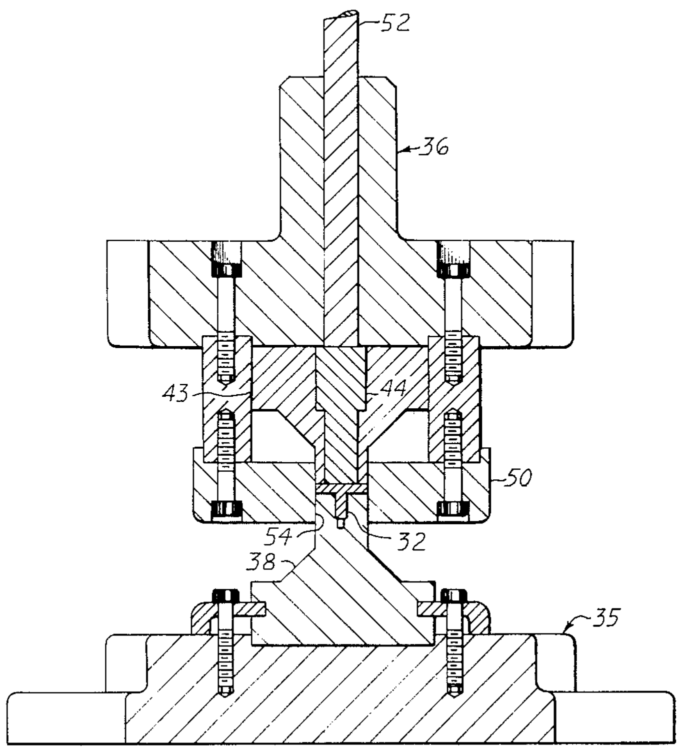
FIG. 11 is a side sectional view of a die apparatus for use in practicing the method of the present invention, the section being taken along a vertical plane through the center line of the die apparatus.

After the silver brazing operation, the composite workpiece of FIGS. 1 and 2 is placed in a suitable die such as the apparatus of FIG. 11 and subjected to pressure to cause the metal in workpiece 20 to flow and assume the shape shown in FIGS. 3 and 4. The confining die is so shaped to cause the metal in the lower portion of the workpiece to extrude downwardly and form a stem portion 32 and the metal in the upper portion of the workpiece to extrude upwardly and form an annular flange 33.

The flats 27 seen in FIG. 4 provide means for gripping the mount with a wrench and can be either formed during the press operation or subsequently machined on a mount that has been pressed to circular configuration.

Figure 12:
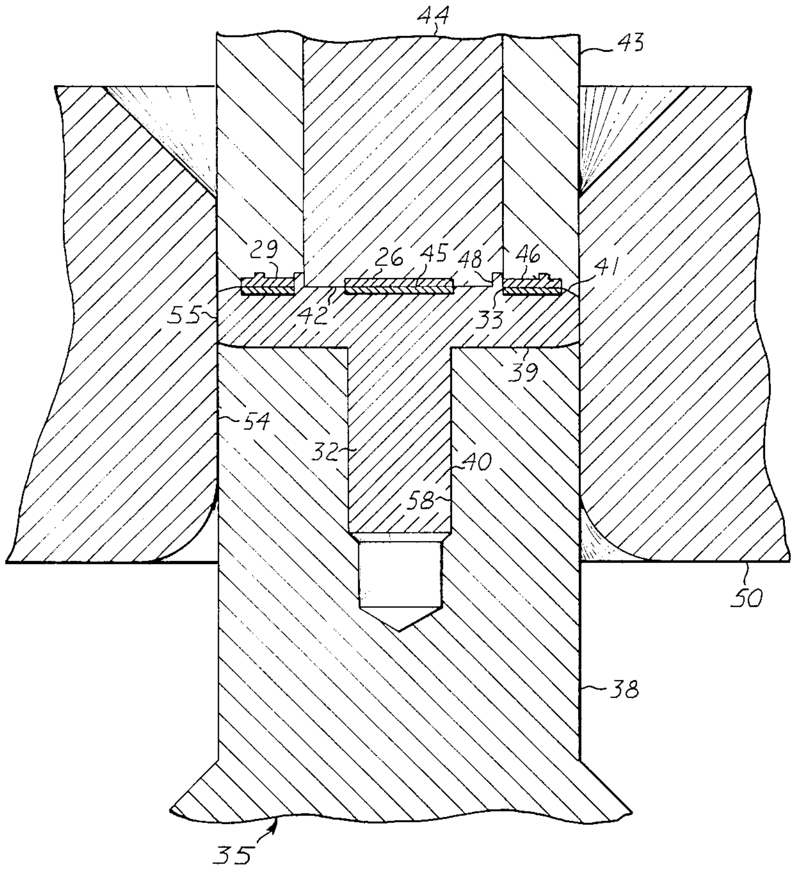
FIG. 12 is a side sectional view showing a portion of the die apparatus of FIG. 11 in larger detail.

Referring next to FIG 11 and FIG. 12 a typical die apparatus includes a stationary base portion 35 for attachment to the bed of a hydraulic press and movable portion 36 for attachment to the ram of the press.

Base portion 35 includes a block 38 that forms a lower pressure applying surface 39 and a recess for receiving the extruded stem 32. The upper pressure applying surfaces 41 and 42 are formed by an annular die element 43 and a rod shaped die element 44. Surface 42 includes a recess 45 for receiving and maintaining the location of molybdenum disk 26. Similarly, surface 41 includes a recess 46 for receiving and maintaining the location of weld ring 29. The die portions 43 and 44 also form an annular recess 48 for receiving an upward flow of metal that forms annular flange 33 during the pressure applying operation. It will be observed from the drawings, FIGS. 11 and 12, that the lower pressure applying surface 29 is substantially flat and that the recess 40, at the junction with the surface 39, is at right angles to said surface 39.

In operation of the die apparatus of FIGS. 11 and 12, the composite workpiece of FIGS. 2 and 3 is placed in the die apparatus with the lower surface 21 resting on the upper surface 39 of block 38. Movable die portion 36 is moved downwardly whereby confining ring 50 moves into surrounding relationship with workpiece 20. As the die continues downwardly, recess 46 surrounds weld ring 29 and recess 45 surrounds molybdenum disk 26. As movable die portion 36 continues downwardly, pressure is exerted on the top surface of the workpiece by pressure applying surfaces 41 and 42 and to the lower surface of the workpiece by pressure applying surface 39. This causes the metal in the lower portion of the blank to extrude downwardly into recess 40 and form stem portion 32, resulting in a substantially flat surface on the underside of the workpiece from the periphery thereof to the stem and the stem extends upwardly to that surface. In addition, metal flows upwardly into annular recess 48 and forms annular flange 33.

Figure 6:
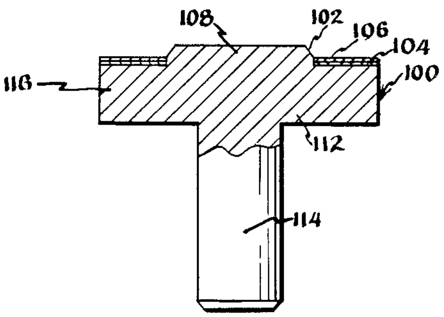

After the assembly is shaped as seen in FIGS 4 and 6, movable die portion 36 including central ejector rod 52 are moved upwardly. Since the surface area of frictional engagement between an inner surface 54 of confining ring 50 and an edge surface 55 of the workpiece is greater than the frictional engagement between an outer surface 57 of stem 32 and an inner surface 58 of recess 40, the workpiece will move upward with movable die portion 36 whereby stem 32 is extracted from recess 40. The upward movement of ejector rod 52 is next arrested while movable die portion 36 including confining ring 50 continue to move upwardly. This causes confining ring 50 to be stripped off of the workpiece as it moves upwardly relative to die elements 43 and 44, said latter two elements being maintained stationary by ejector rod 52.

The stem 32 of the mount of FIGS. 2 and 4 is threaded at 57 after formation of the mount in the confining die.

Figure 5:
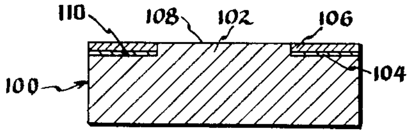
FIGS. 5 through 10 are sectional and partial sectional views of workpieces and transistor mounts formed in accordance with the present invention.

Reference is next made to FIGS. 5 and 6 which illustrate a modified workpiece and semiconductor mount. Blank 100 is formed from copper sheet stock to provide a raised central portion 120, central surface 108, and annular surface 110. A disk 104 of silver-brazing material and a steel weld ring 106 are located on the blank by raised central portion 102. The assembly is heated to a temperature above the fusing point of the silver-brazing material 104, that is to a temperature between 1180 and 1600 degrees F.

The composite blank of FIG. 5 is next subjected to pressure in a suitable confining die similar to the apparatus of FIGS. 11 and 12 whereby a first flow of metal extends central portion 102 upwardly relative to weld ring 106 and a second flow of metal displaces metal from platform portion 112 inwardly and downwardly to form stem 114.

Figure 7:
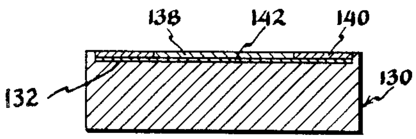
Figure 8:
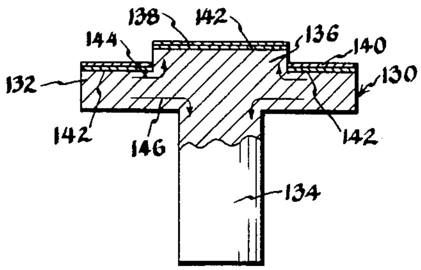

Reference is next made to another modified workpiece and mount shown in FIGS. 7 and 8. A disk-shaped workpiece 130 is provided with a central recess 132 for locating a thin disk of silver-brazing material 142, a molybdenum disk 138, and an annular weld ring 140. The assembly is thermally fused and finished to the shape of FIG. 8 in the manner previously described.

Arrows 144 in FIG. 8 illustrate generally the path of the first flow of metal that forms a raised central portion 136 and arrows 146 illustrate generally the path of the second flow of metal that forms the stem 134. These flows serves to work-harden the metal at the junction of stem 134 and platform 132, and also at the junction of raised central portion 136 and platform 132.

In view of the above it will be understood that the method of the present invention produces radially inwardly directed flows of metal in the platform portions such as platform portion 132 in FIG. 8. This greatly augments the strength of the mounts so far as resisting stresses applied to the platform in directions transversely of the grain structure formed by the radially inwardly directed flows of metal. This is important since the bottom surfaces on the platforms 112 and 132 are substantially plane and at right angles to the stem, yet these bottom surfaces and the top surfaces on the heat sinks are never perfectly plane whereby stresses are applied to the platforms when the mounts are tightened down in the holes in the heat sinks. In this manner intimate contact between the entire bottom surfaces of the platforms 112 and 132 with the top surface of the heat sink is assured.

Another important improvement results from the work-hardening of stem portions such that threads that are subsequently formed thereon possess high strength and are not easily stripped when the mounts are tightened down in their mounting holes in the heat sink. Tests have shown that mounts formed in accordance with the present invention can be subjected to as much as 180 inch pounds of torque prior to stripping of the threads from the stem portions whereas mounts of the same size that were formed by prior methods failed due to stripping of stem threads at torque values as low as 30 inch pounds.

Figure 9:
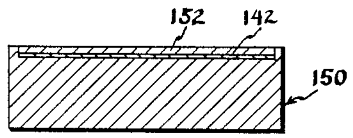
Figure 10:
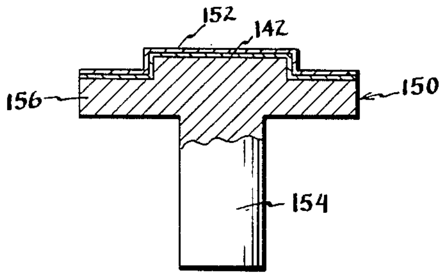

The modification of FIGS. 9 and 10 is formed in the same manner as that of FIGS. 7 and 8 except that a one-piece steel disk 152 is used to cover the entire top of the mount 150 including the sides of the raised central portion of platform 156.

As another modification of the present invention the various semiconductor mounts illustrated in the drawings can be modified to combine a work-hardened platform and stem with an annealed or softened copper weld ring instead of the previously described steel weld rings.

Soft copper weld rings are sometimes advantageous in that the cup-shaped cover portions can be formed of soft copper and attached to the underlying soft copper weld ring by cold welding or pressure welding techniques. This eliminates the necessity of flash welding the covers to the weld rings as is required when steel weld rings are used whereby heating of the assembly is avoided.

In accordance with the present invention semiconductor mounts having annealed or soft copper weld rings are formed in a unique manner wherein the blank for the platform is formed of a copper alloy having a high softening or annealing temperature and the copper weld ring is formed from a metal having a softening or annealing temperature lower than the softening or annealing temperature of the platform stock.

Copper zirconium alloys of the type disclosed in my United States Letters Patent No. 2,928,964 is particularly suitable for fabricating metal blanks from which the platforms are formed. This alloy has excellent electrical and mechanical properties at elevated temperatures and its softening or annealing temperature is high, that is above 750 degrees F.

Other copper alloys, such as chrome copper can be used for forming the platform blanks.

Substantially pure copper is particularly suitable for forming the annealed weld rings of the present invention it being understood that other metal stock can be used so long as the softening or annealing point is below that of the metal stock from which the platforms are formed.

The modified semiconductors having soft copper weld rings are formed by the methods previously described with the added step of heating the assembly, after it is fused, die formed and work-hardened to a temperature which is above the annealing temperature of the metal from which the weld ring is formed and below the annealing temperature of the metal from which the platform is formed. This softens or anneals only the weld ring with the platform being retained in its work-hardened state.

Using the previously mentioned copper zirconium alloy for the platform stock and substantially pure copper for the weld ring stock the assembly is heated at 750 degrees F. for two hours.

After the copper weld ring is annealed a copper cup-shaped cover is mounted on the assembly by cold or pressure welding techniques.

While the forms of embodiments of the present invention as herein disclosed constitute preferred forms, it is to be understood that other forms might be adopted, all coming within the scope of the claims which follow.

I claim:

1. The steps in the method of forming a mount for a solid state semiconductor, said method comprising, forming a metal piece that includes a lower surface and an upper surface from a malleable metal having high electrical and high thermal conductivities characteristics; thereafter brazing a metal element to said upper surface to form an assembly and which brazing causes annealing of the metal piece, said metal element having the characteristic of being capable of being bonded to a piece of metal and thereafter by a single step applying pressure to the assembly while in a confining die, the die having a substantially flat surface and a recess therein, which recess, at the junction with said surface of said die, is at right angles to said surface of said die, to cause the metal of said metal piece to be pressed against said die surface to cause the metal of said metal piece to flow and form a flat lower surface on said metal piece and to cause the metal on said metal piece to flow directly therefrom to form a stem extending from said flat lower surface of said metal piece, immediately at right angles with said flat lower surface of the piece and of substantially uniform diameter throughout the length thereof, said flow of metal serving to work-harden said metal piece.

2. The method defined in claim 1 wherein a raised central portion is formed by the said application of pressure on said upper surface by a second flow of metal from said piece.

References Cited by the Examiner

UNITED STATES PATENTS

| | | | |
|---|---|---|---|
| 401,900 | 4/89 | Palmer | 29—480 |
| 1,999,077 | 4/35 | Benedetto | 29—156.7 X |
| 2,197,609 | 4/40 | Cornell | 29—480 |

(Other references on following page)

UNITED STATES PATENTS

| | | | |
|---|---|---|---|
| 2,320,993 | 6/43 | Worner | 29—480 |
| 2,471,663 | 5/49 | Tietz | 29—480 |
| 2,473,371 | 6/49 | Heath et al. | |
| 2,707,252 | 4/55 | Peter et al. | 317—234 |
| 2,726,357 | 12/55 | Sachs | 317—234 |
| 2,739,369 | 3/56 | Cooney | 29—480 X |
| 2,740,735 | 4/56 | Swain | 148—11.5 X |
| 3,005,867 | 10/61 | Green et al. | |
| 3,024,299 | 3/62 | Nijhuis et al. | 29—470.1 X |
| 3,024,526 | 3/62 | Philipchuck et al. | 29—470.1 X |
| 3,031,746 | 5/62 | Ciarleglio et al. | 29—370.1 X |

OTHER REFERENCES

I.B.M. Technical Disclosure Bulletin, "Diode Heat Sink" (Dunkel), vol. 2, No. 6, April 1960.

JOHN F. CAMPBELL, *Primary Examiner.*